Dec. 27, 1949  H. W. SIEKERMANN  2,492,898
POWER-CONTROLLED PHOTOGRAPHIC ENLARGER
Filed April 4, 1946  3 Sheets-Sheet 1
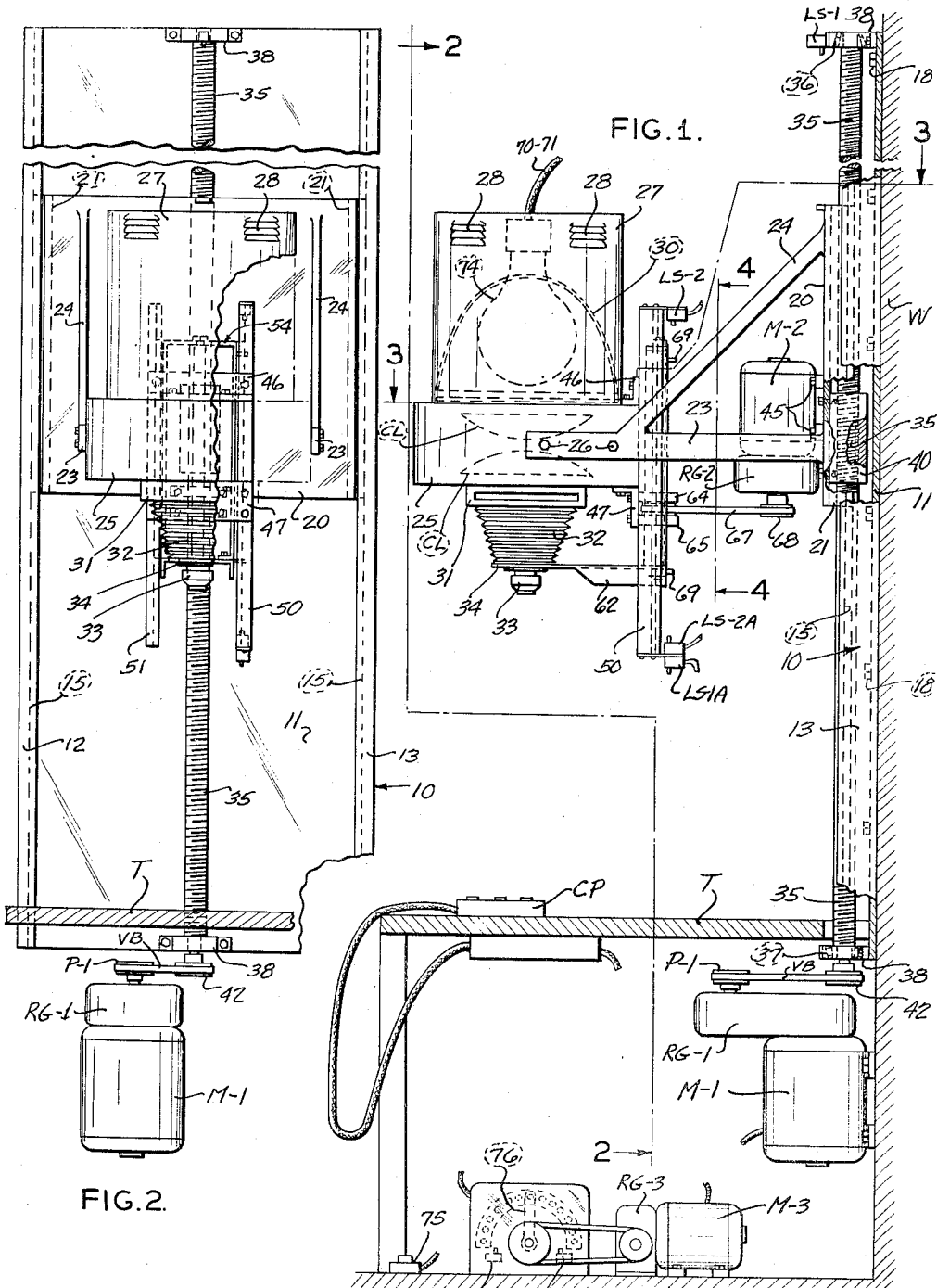
INVENTOR
HARRY W. SIEKERMANN
BY Robert B. Terry
ATTORNEY Dec. 27, 1949     H. W. SIEKERMANN     2,492,898
POWER-CONTROLLED PHOTOGRAPHIC ENLARGER Filed April 4, 1946     3 Sheets-Sheet 2

INVENTOR.
HARRY W. SIEKERMANN
By Robert B. Terry
ATTORNEY

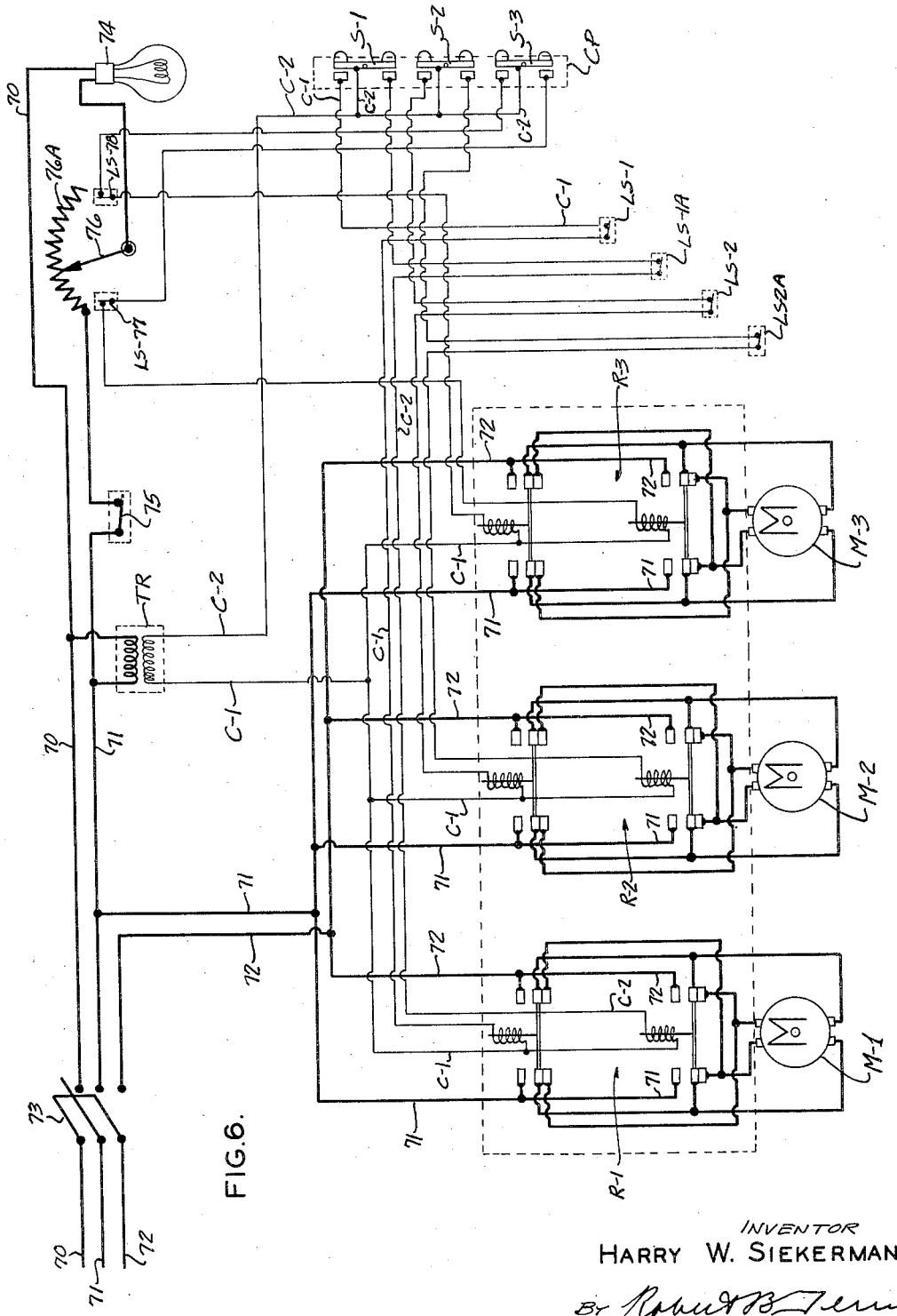

Patented Dec. 27, 1949

2,492,898

UNITED STATES PATENT OFFICE 2,492,898

POWER-CONTROLLED PHOTO-
GRAPHIC ENLARGER

Harry W. Siekermann, St. Louis, Mo., assignor to
Robert H. Paschen, Jr., Webster Groves, Mo.

Application April 4, 1946, Serial No. 659,503

3 Claims. (Cl. 88—24)

This invention relates to improvements in power-controlled optical assemblies, and more particularly to photographic printing and projection apparatus, for example, such assemblies as are commonly referred to as photo enlargers. The present improvements are particularly, but by no means exclusively, adapted to commercial units, by reason of improved speed of projection printing and a more precise control resulting from usage of the present features.

Within the knowledge of the present designer, there has heretofore been offered to the trade no satisfactory projection printing equipment which is fully power-operated, and no apparatus of this class suitable for careful and precision work without entailing the requirement of much manual manipulation of controls to attain the ultimate degree of optical correctness, and hence of fine workmanship, in finished projection printing. Accordingly the invention has, as a general objective, the production and supply to the trade of precision optical projection systems which are or may be fully power-operated as by small electric motors, thus enhancing greatly the speed of projection photo printing and attaining a high degree of precision workmanship with uniformity of results.

A further object of the invention is attained in an improved, more convenient coordinated electrical control system for the general purposes noted, including electric motor means enabling either individual or concurrent motor operation of an enlarger along its optical axis, a critical and precise focusing provision, and a quickly and accurately controllable degree of illumination for projection printing, in the preferred arrangement, the controls for these various functions being physically accumulated and arranged for selective or concurrent manipulation by an operator adjacent the projection surface, easel or copyboard.

A still further and important objective of the invention is attained in improved means for precisely guiding an optical assembly such as a photo enlarger, in movement in either direction along its optical axis, whereby to confine the enlarger to virtually a linear path of movement within limits of precision production of its parts.

Yet an additional object of the invention is attained in a quick, accurate and unusually precise power-operated agency for focusing a photo enlarger, for example, and so arranged that a movable lens board or other focusing structure may be actuated within limits of one thousandth inch in either direction, by power means such as an electric motor and associated power-transmission means.

Still a further important object of the invention is attained in an improved simplified control circuit and arrangement of conductors therein such as to place under instant and accurate control, the several motors or like instrumentalities, for varying projection distance, accurately focusing, and controlling intensity of a projection illuminant.

The foregoing and numerous other objectives and advantages will more clearly appear from the following detailed description of a single, presently preferred embodiment of the invention, particularly when considered in connection with the accompanying drawing, in which:

Fig. 1 is a side elevation of a power-operated optical projection assembly shown as a photo enlarger, constructed to embody the present invention, certain parts of this figure being broken away and others shown in section for better illustration of detail;

Fig. 2 is a front elevational view, taken in staggered vertical planes, of the assembly of Fig. 1, and specifically along line 2—2 thereof;

Fig. 6 is a circuit or wiring diagram showing the circuit relation of and between the several conductors, control switches for control-actuating motors, relays and limit-switching provisions.

Figure 3:
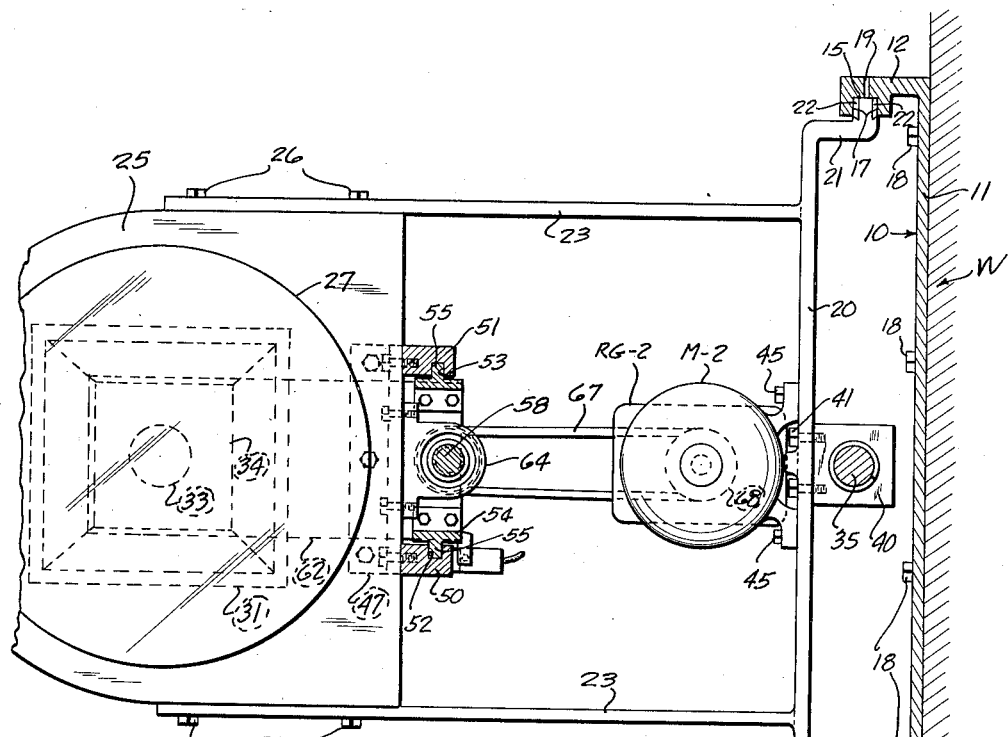
Fig. 3 is a fragmentary transverse sectional elevation of the structure of Fig. 1 as viewed along staggered lines indicated by line 3—3 of Fig. 1.

Referring now by characters of reference to the drawing, it is contemplated as a preference that the structural and supporting elements of the assembly be at least semi-permanently mounted, as adjacent a wall or column W, to which is secured a wide, rigid, accurately aligned and machined track-forming structure generally indicated at 10, and which as will later appear, serves as trackage for an enlarger carriage. This trackage-forming unit includes, preferably as an integral casting of a light, non-ferrous alloy, a back plate 11 which with side rails 12 and 13, forms a shallow, wide, U-shaped structure of unusual rigidity. Each of the rail portions 12 and 13 forms one of the track elements proper, and is provided along its inner face with a channel 15, the opposite lateral surfaces of which are indicated at 17, and are ground or otherwise formed to accurate parallelism within close limits, and serve as will appear, as the guiding or trackage surfaces for the carriage. It is contemplated that the channel structure comprised of major parts 11, 12 and 13 will be carefully plumbed (assuming without restriction a vertical mounting), so that the track surfaces 17 lie as closely as possible within vertical planes. A fixed mounting of the trackage through the back plate 11, may be cared for in any suitable manner, for example by bolts, cap screws, or lag screws, the heads of which are indicated at 18.

Cooperating with the track surfaces 17 is the base element of the enlarger carriage, the base shown as being of inverted U-shape in section or in end elevation, and includes a relatively long and wide planar plate portion 20 with opposite downturned margins 21, the latter being turned outwardly to form guide flanges faced with bronze inserts 22. These latter are fitted and accurately finished as closely to parallelism of their opposite surfaces as possible, and so cooperate with scarcely more than working tolerances, with the surfaces 17 as the carriage is moved, for example, vertically along the trackage therefor. A number of lubricant passages 19 are provided, spaced evenly along the trackage. It is preferred for rigidity of support and accuracy in guiding the movement of the carriage, to form the main carriage, particularly the base plate 20 thereof, of a length at least equal to that of the major portion of the enlarger assembly proper, as will appear from Fig. 1. Extended outwardly from the base plate 20 of the carriage are a pair of normally horizontal arms 23 (assuming a vertically movable enlarger carriage), the arms 23 being integral with or rigidly united to a pair of struts or braces 24, both arms and braces being desirably integral with the base 20. The free ends of arms 23, as will be noted, are securely fastened to the rigid body, for example, the condenser enclosure 25 of the projector, as by bolts or screws 26.

The various parts of the enlarger per se, are or may be of conventional construction, it being noted for completeness that, in addition to the condenser lens assembly CL, and enclosure 25 therefor, this housing is surmounted by a lighthouse 27 within which is disposed a parabolic reflector 30. The lighthouse is provided with heat dissipating condensers or ventilators of light-trapping type, as indicated at 28. Below the housing 25 is a negative carrier 31 to which is attached the larger end of bellows 32 and the objective lens assembly 33. The latter is shown for convenience as carried by a lens board or the like 34. The normal use and operation of enlarger assemblies of this general type are well known to those skilled in the art, and hence require no extended description of function or operation. In the interest of brevity, many of the details of the optical assembly per se, have been omitted.

It will be understood that the printing paper or the like is usually mounted, with suitable clamping provisions if desired, on a printing surface identified with the table T which is subjacently supported from a floor or the like and which, now obviously, will be normally fixed in definite angular relation to the trackage structure for the enlarger carriage. The table T is preferably supported by means (not shown) such that its height and its angularity may be varied.

For power actuation of the main enlarger carriage, for the purpose of varying the general projection distance between say the negative carrier 31 and the table T, there is employed a rotatable, vertical, threaded shaft 35. This shaft is of relatively large diameter, preferably formed with square cut threads for better resistance to wear and lessened liability of thread deformation, the shaft being supported at its opposite ends in the example shown, in roller bearing assemblies of thrust type, the upper one of which is shown at 36 and the lower at 37, the shaft being undercut to form an accurate cylindrical bearing surface with which the rollers of these assemblies coact. Each of the roller race assemblies is carried by a fixed bearing arm 38 secured to extensions, top and bottom, of the plate 11, and if desired these arms may be formed by casting them integrally with the trackage structure.

Coacting with the threaded shaft 35 is a traveling nut indicated at 40, the internal threading of which coacts with the shaft threads, this nut being in the form of an internally threaded sleeve which for rigidity and strength is of substantial length and preferably of rectangular cross section (see Fig. 3). It is desirably of bronze or a similar non-ferrous metal, and is suitably tapped to receive securement screws 41 by which the nut is centrally affixed below and to a median zone of the base plate 20 of the main carriage.

Power actuation of the main carriage will, now obviously, occur upon rotation of shaft 35, and in the example shown the source of power for this purpose is found in the reversible motor M—1, suggested as being of one-fourth H. P. 110 volt A. C. or D. C. type according to available power source. Mounted for convenience on the end bell of motor M—1, is a reduction gear unit RG—1, the power takeoff of which is a pulley P—1 connected as through a suitable V-belt VB, to a pulley 42 secured to a projecting end of shaft 35 below the bearing arm 38. It will now appear clear that the motor M—1, being reversible, will, in one direction of rotation actuate the shaft 35 to raise the entire movable enlarger assembly, while in the opposite direction of rotation motor M—1 will serve to lower the carriage and parts supported thereon.

By way of further description of the controls and operating elements therefor mounted on the main carriage, the enlarger proper the major elements of which have been heretofore briefly referred to, is constructed around the main body or housing 25 containing the condenser lenses CL in any desired number and arrangement. This casing or housing 25 is attached to the carriage bracket structure 23—24 through screws 26, and is preferably formed, similarly to other structural portions of the carriage, of a light weight, non-ferrous metal, for example, aluminum, magnesium or alloys thereof, for the purpose of keeping the center of mass of the enlarger and main carriage assembly, unusually close to the trackage therefor.

To this end the enlarger proper may be made extremely light in weight, and the motor M—2 may be of a small fractional H. P. size and of special construction so as to minimize its weight. For the purpose noted, the motor M—2 is significantly disposed immediately adjacent the plate 20 of the main carriage, being secured thereto as by screws 45 in a location immediately opposite the nut 40.

Secured against opposite end faces of the body 25 of the enlarger, are a pair of angle brackets 46 and 47 which, through suitable screws, serve to support a pair of widely spaced fixed rails 50 and 51. These are shown at 52 in the element 50, and 53 in the rail 51. Slidably disposed for movement in either direction along rails 50 and 51, is an auxiliary carriage in the nature of a rigid rectangular frame generally indicated at 54. This frame is provided with longitudinal extensions one from each of its opposite sides as indicated at 55, and which may be of bronze, or faced therewith, but in any case the track-riding elements being accurately and smoothly finished, as are the channels in which they operate, so as to provide not more than an appreciable working clearance between these and the track elements, and yet to assure smoothness of operation without sticking tendencies or undue friction at rest. This relation of parts is thus generally similar to that prevailing between the elements 22 and channels 15 in the main carriage and track assembly. Similar lubricating provisions (not shown) may be employed in this region.

The frame 54 is comprised of any desired number of cross members to assure rigidity and rectangularity, as shown these consisting of end members 56 and 57. The frame or secondary carriage 54 is formed in part of a longitudinal median shaft 58 characterized by a low pitch threading, the shaft being squared at its ends as at 60 and apertures for the squared ends being correspondingly formed in end elements 56 and 57 whereby the shaft 58 is nonrotatably mounted in the frame 54. The shaft 58 is reduced in diameter beyond its squared portions, and threaded for the reception of assembly nuts 61.

Extended forwardly or outwardly of the frame 54, is an element 62 which, as best seen in Fig. 1, is secured to the lens board 34 of the enlarger or is otherwise connected to the objective lens system thereof for focusing purposes. Thus it appears that movement of the frame 54 in either direction, will similarly move the lens board 34, with the effect of attaining an accurate focus of a projected image on the paper over table or copyboard T.

Figures 4, 5:
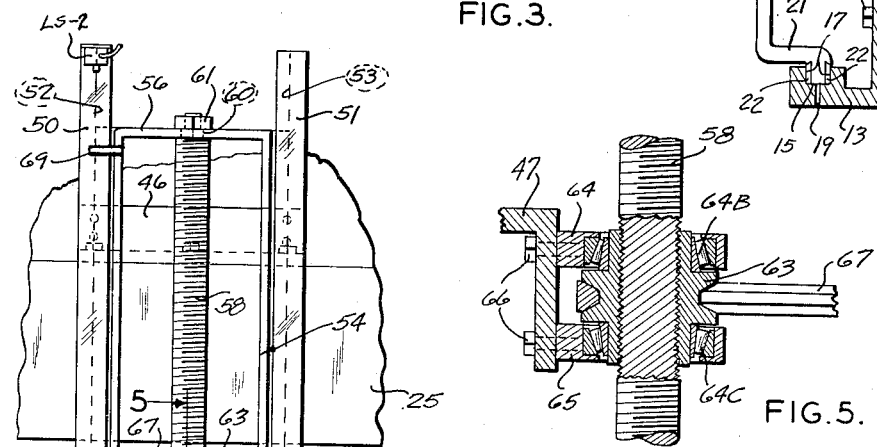
Fig. 4 is a fragmentary elevational view as taken along line 4—4 of Fig. 1 and illustrating certain features of the power-actuated focusing control.
Fig. 5 is a fragmentary sectional view illustrating certain details of the drive for the focusing control arrangement, this section being taken along line 5—5 of Fig. 4.

Powered actuation of the frame 54 is attained through a rotatable nut with which is combined a driven pulley, this element 63 being preferably of bronze or similar material, and best appearing in section in Fig. 5. The nut is microthreaded, i. e., provided with an unusually low pitch threading necessarily corresponding to that of shaft 58, thus constituting therewith a so-called traveling nut assembly, although in the particular example selected the nut is axially stationary and the shaft axially movable to carry with it the frame 54 for focusing purposes. It has been determined that, with the shaft and nut provided with 40 threads per inch, and by restricting the speed of this shaft to five inches or 200 threads per minute, it is possible to move this assembly only 1/1000 inch, up to a total of say 15 inches. Provision for axial fixation of the pulley-nut 63 while permitting its rotation, consists of a pair of spaced bearing arms 64 and 65, each carrying an antifriction bearing assembly, shown as of thrust-roller type, these being designated as 64B and 64C, and each rotatably receiving a journal extension of the element 63. The bearing assemblies 64 and 65 are conveniently supported as through screws 66 which engage the angle element 47 secured in turn to the body or housing 25 of the enlarger. Rotation of the combination pulley and nut element 63 is conveniently effected as by a single V-belt 67 powered by a pulley 68 constituting the takeoff element of a reduction gear unit RG—2, carried as by one end bell of motor M—2. It now appears clear that operation of motor M—2 will serve to actuate the frame or second carriage 54 in one direction, and that opposite movement of the frame results from opposite rotation of motor M—2 acting through its reduction unit, pulleys and belting to element 63.

Provision for positively preventing over travel of the frame 54 is presently shown as consisting of a pair of extensions 69, one at or near each opposite end of the frame 54, and which are located to engage, selectively according to direction of travel of the frame, one of the micro switches constituting limit switches LS—2 at one end, and LS—2A in the opposite end zone of the track 50—51, the circuit relation of these switches being later more fully described, and their circuit relation diagrammatically indicated in Fig. 6.

Referring now to the several electrical and control elements, and the circuit relation thereof, since many of the individual items of electrical apparatus are or may be of conventional construction, it is regarded as sufficient for present purposes briefly to point out the present preference as to their electrical relations. In the diagram of Fig. 6, the supply mains are indicated at 70, 71 and 72, which may be considered as a three-wire 110–220 volt arrangement, the main line switch 73 being conventionally and conveniently located. Each of the three motors M—1, through which the main carriage is actuated, M—2, by which the focusing frame is operated, and M—3 actuating the movable element of the variable resistance unit, all preferably operate say at 110 v. or other conventional line voltage. On and off switching and reversal of each of the three motors is selectively effected through a pair of reversing relays provided for each motor, these relays being of electromagnetic or solenoid type, and the coils thereof being energized and their circuits switch-controlled, in and by a separate control circuit of reduced voltage, and which may conveniently be served within the range of 10–15 v.

Referring now to the diagram of Fig. 6, it will appear that, assuming switch 73 to be closed, conductors 70 and 71 are energized, serving directly to energize through a series switch 75 and a variable resistance unit 76, the light 74. This illuminant may be of incandescent or other suitable type say of 1000 watt rating, and located in the lighthouse 27 of the enlarger. The resistance element 76A of the variable resistance unit is by preference of such rating as to enable variation in voltage to the illuminant 74 either continuously or by steps, between darkout and maximum illumination. The switch 75 briefly above referred to, is preferably utilized as a foot-switch physically located adjacent the table T, for convenience of operator access, as in Fig. 1. As shown by Fig. 1, the motor M—3 serves to operate in either direction the movable arm 76 of the variable resistance unit, as through a reduction gear RG—3, and the belt drive or geared connection to the arm. The rheostat is shown as provided with a series of spaced contact buttons which are selectively and progressively engaged by the arm 76 as the latter traverses the arcuate path therefor, between limits identified with the pair of limit switches LS—77 and LS—78, the circuit relation of which will clearly appear from the circuit diagram and will later be described.

The reversing relay assembly controlling the motor M—1, is generally indicated at R—1; the corresponding relay assembly in controlling relation for selective energization and reversal of motor M—2, is indicated at R—2, and a corresponding assembly as shown at R—3, serves the motor M—3 actuating the variable resistance unit, specifically the movable arm 76 thereof. The magnet coils of the relays R—1, R—2 and R—3 are energized through a transformer TR, the primary terminals of which are shown as in circuit with the line conductors 70 and 71. The inductance unit TR need be of only relatively small rating and conveniently of 1:10 ratio, the secondary thereof serving to supply the conductors C—1 and C—2 which serve to feed the control circuit proper, as will appear. For the purpose of switching and directioning control of the three motors through the control circuit C—1——C—2, there are provided, preferably on a common control panel CP (Figs. 1 and 6), a plurality, shown as three, of push button switches S—1 controlling motor M—1 and hence movements of the main carriage; S—2 controlling motor M—2 for focusing actuation as by movement of the focusing frame, and S—3, being the switch controlling direction of rotation of motor M—3, hence direction of movement of variable resistance arm 76. Each of the switches S—1, S—2 and S—3 may be considered for purposes of description of circuit, as a single pole double-throw switch, the movable elements of each thereof being in circuit with a bus extension of line C—2.

Assuming now for example the switch S—1 to be closed against its uppermost (Fig. 6) fixed contact, it will appear that the circuit is completed from the adjacent conductor C—2 through the movable switch element, thence via line C—1 through a limit switch LS—1, thence through the uppermost coil of relay assembly R—1 with return to the transformer T. This will effect an upward (in Fig. 6) movement of the paired movable contacts immediately adjacent the upper coil and therethrough, in coaction with the uppermost pair of stationary contacts, serve to supply the lowermost motor terminals, causing actuation of the motor say in a forward or carriage-lifting direction. When the switch S—1 is closed in the opposite direction, i. e. against its lower fixed contact, the latter connected into control line C—2, completes a circuit, the flow through which is traceable through a companion limit switch LS—1A, thence energizing the lowermost solenoid or coil of the relay assembly R—1 and, now obviously, serving to lift the paired movable contacts associated therewith, in a manner to cause them to engage the upper pair of adjacent fixed contacts, thus completing the circuit through the cross-switched arrangement of conductors, into the opposite set of terminals, of motor M—1, actuating same in a direction opposite that first above described. The cross switch arrangement of conductors and contacts in the relay, are felt to be evident from the circuit diagram, and to require no further detailed explanation. It may be noted in passing that the circuit arrangement is or may be identical, as shown, in each of the relay assemblies R—1, R—2 and R—3. Accordingly it will now appear as obvious that closing of switch S—2, controlling the focusing motor M—2 by depression of the uppermost button of this switch, will, assuming limit switch LS—2 to be closed, energize the uppermost coil of relay R—2 to result in what may be referred to as forward rotation of the focusing motor, whereas closure of switch S—2 by depression of its lowermost button will, now obviously, energize through limit switch LS—2A the opposite pair of terminals of motor M—2 and result in a relatively reverse rotation of this motor.

The contacts, magnet coils, structure and internal circuit of relay assembly R—3 being taken as identical with those of the relays R—1 and R—2, it is now seen that closing switch S—3 in one direction will always close the circuit to motor M—3 to cause, say, advancement of resistance arm 76 to decrease resistance interposed by the unit and that opposite actuation of motor M—3 will have a dimming effect on the projection illuminant 74.

From the foregoing it becomes obvious that actuation of switch S—1 will, assuming limit switch LS—1 to be closed, serve, say, to raise the main carriage, and closure of the same switch in an opposite direction will serve to lower the carriage. All of the switches S—1, S—2 and S—3 may, if desired, be of self-opening type so as to require continued manual pressure to maintain closure thereof in either direction.

Assuming now that the predetermined or optimum projection distance of the enlarger, which may be considered as the distance between the negative carrier 31 and the table or copyboard T, has been attained by lifting or lowering the main carriage, the negative is inserted, if not previously in place in the carrier, and the intensity of illumination by light 74 is established by actuation in appropriate direction, of switch S—3. For purposes of enlarging, prior to actual printing and exposure, the step of focusing is effected by the focusing motor M—2, acting on the focusing frame as by a series of step movements, will enable an extremely close regulation of the focusing arm, and without any undue loss of time serve to attain an optimum focus.

It will thus have appeared that by the various control agencies, and the aggroupment of the switches S—1, S—2 and S—3 on the common control panel CP, it becomes possible either selectively and in turn, or to the full extent practically possible, concurrently to energize the several powering agencies for regulating projection distance, focusing, and intensity of projection illumination.

Throughout the present design there have been objectively stressed smoothness of operation and reduced weight of moving parts, in order to reduce starting lag in either direction and lost motion incident to reversal of operation. Furthermore, accurate machining throughout conduces to maintenance of a fixed optical axis at all times and in all possible positions of the enlarger, except of course as the angularity of such axis may desirably be varied from the vertical for purposes of perspective correction and the like incident to certain types of photo printing. The extremely wide spacing of the trackage elements 13 conduces to the foregoing results, as also does the wide spacing of the trackage elements 50 and 51. This purpose is further promoted by the unusual length of the guide portions of the main carriage, it being noted that the flanges 22, or any equivalent track-engaging structure, are of a length approximating that of the major elements of the optical assembly, thus obviating any cocking tendencies which might result from a shorter carriage and a more narrow trackage.

For brevity herein, the description has dealt primarily with a photographic enlarger assembly. It will of course be understood as within present intendment that many of the features are equally applicable to photocopying and photographic equipment for certain purposes, and in other optical units wherein a powered control is desirable.

Although the description has for brevity, closely followed the drawing in reference to a powered enlarger assembly arranged for vertical movement, it is obvious that the same general principles are applicable without extensive modification, in an assembly which is characterized by a horizontal or sloped path of travel of the optical unit. Thus, except where expressly stated in the claims, the reference to vertical arrangements and travel is to be understood solely in a relative, and not in any restrictive sense. Further, the detail of description given for completeness is to be understood solely in an instructive rather than in any limiting sense, because of the numerous variants possible within the scope of the claims hereunto appended.

I claim as my invention:

1. In a power-operated photo-projection assembly, an optical projection unit, a main carriage for the unit, a pair of parallel track elements arranged along a common plane at one side of the optical axis of said unit, each such track element consisting of an internally channeled element, opposite faces of the channel in each element being in precise parallelism and the channels each being of substantial depth, the track elements being widely spaced and arranged in opposed facing relation, the two track elements being permanently assembled as parts of an integral and common mounting base therefor, the carriage being provided with opposite, outwardly projecting track-engaging guiding portions, the carriage being of a length approaching that of the projection unit whereby to minimize cocking tendencies, said track-engaging portions of the carriage operating in the channels of the track elements with only such tolerances as will assure ease of movement of the carriage along the track elements, and power means for operating the carriage along the track elements, including a shaft and a power unit for operating the shaft, the shaft being disposed between the track elements with its axis substantially in a plane common to the channels of the track elements.

2. In a power-operated photo-projection assembly, an optical unit, a carriage on which the unit is mounted, a track structure for the carriage consisting of a one-piece channel structure of substantial width, each of the sides of which form a track rail characterized by spaced parallel planar surfaces, the carriage provided with a track-engaging member of a generally U-shaped section, the legs of which are formed to provide track-engaging and track-guiding elements arranged to operate along the track surfaces and between the planar surfaces thereof with not appreciably more than working tolerances, a rotary threaded shaft disposed centrally within the channel forming the track structure and between the track structure and the track-engaging member so as to be at least partly enclosed thereby, means whereby the shaft may be rotated, a traveling nut on the carriage, operatively engaged by the threaded shaft, a focusing frame on the carriage, a relatively wide track structure consisting of parallel guide rails on the carriage, said focusing frame being guidedly carried by the last said rails, a threaded shaft supported longitudinally and intermediately the sides of said frame, a nut rotatable on said shaft, the nut being axially fixed with respect to the carriage whereby rotation of the nut actuates the frame in a linear direction, a focusing connection from the frame to the optical projection unit, and means enabling actuation of the rotatable nut.

3. In a power-operated photo-projection assembly, an optical unit, a vertically movable carriage by which the unit is supported, a track for said carriage consisting of a vertical unitary channel structure of a shallow, substantially rectangular cross section, and including a rigid vertical back and forwardly projecting arms, each of the arms forming the carriage track elements and each provided with an inwardly opening substantially rectangular channel, each channel having opposite planar vertical faces accurately finished to close tolerances, the carriage including a base of a generally U-shaped form presented in relatively inverted relation over the track structure, the arms of the carriage base having outturned flanges each with parallel faces and each operating in one of the channels of the carriage track structure and fitted therein to close tolerances, an elongate, rotatable, threaded shaft arranged vertically within and medially of the carriage track structure and provided with antifriction bearings, a traveling nut operable upon and linearly movable by the threaded shaft, the nut being secured centrally and medially of the U-shaped base portion of the carriage, and motor means for operating the threaded shaft for raising and lowering the carriage and optical unit.

HARRY W. SIEKERMANN.

REFERENCES CITED

The following references are of record in the file of this patent:

UNITED STATES PATENTS

| Number | Name | Date |
| --- | --- | --- |
| 1,491,746 | Fritsche | Apr. 22, 1924 |
| 1,641,346 | Meder | Sept. 6, 1927 |
| 1,666,770 | Buben | Apr. 17, 1928 |
| 1,715,526 | Williamson | June 4, 1929 |
| 2,306,885 | Klemm et al. | Dec. 29, 1942 |
| 2,307,479 | Annick | Jan. 5, 1943 |
| 2,383,161 | Pratt | Aug. 21, 1945 |
| 2,390,065 | Gelb | Dec. 4, 1945 |